United States Patent [19]

Gibson

[11] 4,391,740

[45] Jul. 5, 1983

[54] LARGE PORE SHAPED HYDROPROCESSING CATALYSTS

[75] Inventor: Kirk R. Gibson, El Cerrito, Calif.

[73] Assignee: Chevron Research Company, San Francisco, Calif.

[21] Appl. No.: 291,588

[22] Filed: Aug. 10, 1981

[51] Int. Cl.³ .............................................. B01J 35/02
[52] U.S. Cl. .................................. 252/470; 252/467; 252/477 R; 208/216 PP
[58] Field of Search .................. 252/477 R, 467, 470; 208/216 PP

[56] References Cited

U.S. PATENT DOCUMENTS

| | | | |
|---|---|---|---|
| 2,408,164 | 9/1946 | Foster | 252/477 R |
| 3,764,565 | 10/1973 | Jacobs et al. | 252/470 |
| 3,966,644 | 6/1976 | Gustafson | 252/455 R |
| 4,133,777 | 1/1979 | Frayer et al. | 252/465 |

Primary Examiner—W. J. Shine
Attorney, Agent, or Firm—D. A. Newell; S. R. LaPaglia; C. L. Hartman

[57] ABSTRACT

Catalyst shapes for inorganic oxide, hydroprocessing catalysts are disclosed. When the catalyst is used for diffusion limited reactions, and particularly when it is used for demetalation, shaped catalysts give longer catalyst lifetimes. Preferred shapes include oval and elliptical shapes, with and without bumps.

8 Claims, 3 Drawing Figures

LARGE PORE SHAPED HYDROPROCESSING CATALYSTS

BACKGROUND OF THE INVENTION

This invention relates to catalytic compositions and their use for the hydroprocessing, e.g. hydrodesulfurization and hydrodemetalation of feedstocks containing sulfur and metals. In particular, this invention concerns shaped extruded catalysts that are polylobal in cross-section.

A number of catalyst shapes have been described in the prior art. U.S. Pat. No. 2,408,164 to Foster discloses catalyst shapes including solid and hollow cylinders, elongated star shapes, cylinders with corrugated edges, etc. Similar shapes are also shown in U.S. Pat. No. 3,997,426 to Montagna et al. U.S. Pat. Nos. 3,966,644 and Re. 30,155 issued to Gustafson disclose trilobal catalysts for hydrocarbon conversion. U.S. Pat. Nos. 3,674,680 and 3,764,565 to Hoekstra and Jacobs disclose catalyst shapes designed to eliminate catalytic material more than 0.015 inch from the catalyst surface and give surface area to volume ratios of between 100 and 250 inch$^{-1}$. U.S. Pat. No. 3,347,798 to Baer et al. discloses the production of hollow bead catalysts. U.S. Pat. No. 3,957,627 discloses spherical catalysts having a void center and a hole extending to the external surface. U.S. Pat. Nos. 4,116,819 and 4,133,777 disclose catalysts in the shape of elongated extrudates having alternating longitudinal grooves and protrusions on the surface.

The purpose of shaped catalysts has been to increase surface-to-volume ratio over conventional shapes, such as round cylinders and spheres to increase effective diffusion and increase metals loadings. Surface-to-volume ratios can be increased by reducing the size of the particles, but beds of such particles tend to have unacceptably high pressure drops across the bed.

SUMMARY OF THE INVENTION

The present invention provides a process for hydroprocessing hydrocarbonaceous feedstocks containing more than 10 ppm nickel plus vanadium by use of shaped catalyst particles. The feedstock is contacted with hydrogen under hydroprocessing conditions with porous catalyst particles that are elongated extrudates of defined non-circular cross-section that can be circumscribed by a rectangle having a first dimension in the range of between about 0.0600 inches and about 0.085 inches and a second dimension, perpendicular to the first dimension, in the range of between about 0.030 inches to about 0.065 inches. Substantially all the points in the interior of the catalyst particles are within 0.020 inches from the nearest extruded surface of the particles. The particles of this invention will have an external surface area-to-volume of less than 95 reciprocal inches, and have an average calculated pore diameter within the range of between about 120 Angstroms to about 700 Angstroms, preferably within the range of between 120 Angstroms and 200 Angstroms. The catalyst particles will be characterized by substantial penetration of nickel and vanadium at least 0.012 inches from the nearest surface of the particles. Preferred cross-sections include ovals and ellipses, with or without one or more protruding "bumps". The size, shape and porosity of the particles of this invention are selected such that under hydroprocessing conditions substantial penetration of nickel or vanadium will be observed at 0.012 inch from the surface of the catalyst, preferably 0.015 inch.

DETAILED DESCRIPTION

Feedstocks

Figure 1:
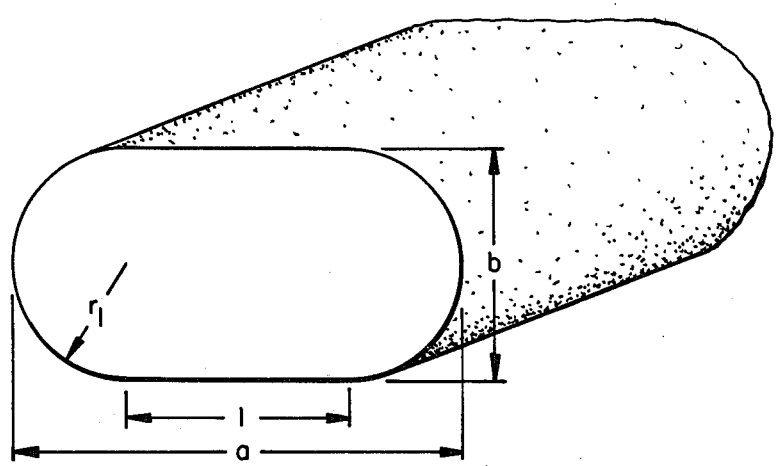
FIG. 1 shows a view of an oval shaped particle.

Due to shrinking world supply of crude oil, oil processers and refiners must use crudes that are highly contaminated with metals, particularly iron, nickel, and vanadium, and have high concentrations of nitrogen and sulfur. Valuable light products can be made with heavy metal containing feedstocks, for example, crude oil, topped crudes, atmospheric and vacuum residua, and various synthetic oils, for example, liquefied coal, and oil from oil shale, if the contaminating metals can be removed. Typical feedstocks that can be improved by use of the shaped catalyst of this invention include those with as high as 10 weight percent or more asphaltene content, where asphaltene is defined as that portion of the feedstock not soluble in n-heptane. Asphaltenes include as a major constituent large molecules that bind metals. The feedstocks of this invention will be characterized by containing at least 10 ppm nickel plus vanadium.

Catalyst Bases

Any catalyst base with a minimum mean pore diameter of about 120 Angstroms, as well as those with much larger pore diameters can be used for the catalyst particles of this invention.

Average pore diameter can be calculated by the following formula:

Average Pore Diameter $= (4 \times PV \times 10^4)/SA$, where PV is equal to particle density−skeletal density, and SA is catalytic surface area, as determined by nitrogen adsorption. The average pore diameter is expressed in Angstroms, pore volume in cc/grams and surface area in m$^2$/g. Typical catalyst bases include those made of alumina or silica, or both, as well as other refractory inorganic oxides, for example, boria, magnesia, titania and the like. The catalyst support of the present invention can be manufactured by any conventional techniques. Catalyst bases can be all or part fibrous clays, for example sepiolite, attapulgite or halloysite.

The base may contain catalytic metals, in particular metals from Group VIB of the periodic table, especially molybdenum and tungsten and from Group VIII of the periodic table, especially nickel and cobalt. Catalytic metals may be placed in the support by conventional techniques, such as, comulling, impregnation and the like. Levels of metals useful for this invention are between 2 and 15 weight percent and preferably between 5 and 12 weight percent Group VIB metal when weight percent is measured as weight of reduced metal as a percentage of total particle weight, and between 0 and 10 weight percent and preferably between 2 and 4 weight percent of Group VIII metal when weight percent is measured as weight of reduced metal as a percentage of total particle weight. Preferred Group VIB metals include molybdenum and tungsten, and preferred Group VIII metals include nickel and cobalt.

Shaped Catalyst Particles

One method to increase surface-to-volume ratio is to shape an extruded particle in shapes with other than solid circular cross-section. A variety of shapes are possible, including particles with channels, with holes in them, having star shapes and the like. Although the teachings of this invention apply to any catalyst having a polylobal cross-section, it has been found that preferred shapes are dictated by two practical considerations. The first consideration is the manufacturing ease for making the die plate for the extruder. One preferred set of shapes includes those shapes that comprise overlapping circular elements, defined herein as fluted shapes. Die plates for these shapes are easily made by drilling overlapping circular holes. More complicated shapes can be obtained by punching the shapes out of the die plate. This is the preferred method for making elliptical and oval shapes, both with and without bumps.

The second consideration is that the shape chosen and the surface-to-volume ratio of the particles extruded change within acceptable limits as the die plate wears during extrusion. Excessive wear, partially due to corrosion, has been found to be a problem with conventional die plates which are frequently made from carbon steel. Alternative materials exist that may provide solutions to this problem, for example stainless steel and tungsten carbide dies, but wear will always be a factor in choosing a shape for extrusion of porous catalytic material.

The shape chosen should increase effective diffusivity and metals loading over round cylindrical shapes. It is believed that oval shapes and elliptical shapes have even better diffusivity and metals loading than do shapes of higher surface area to volume ratios but comprising circular segments.

Figure 2:
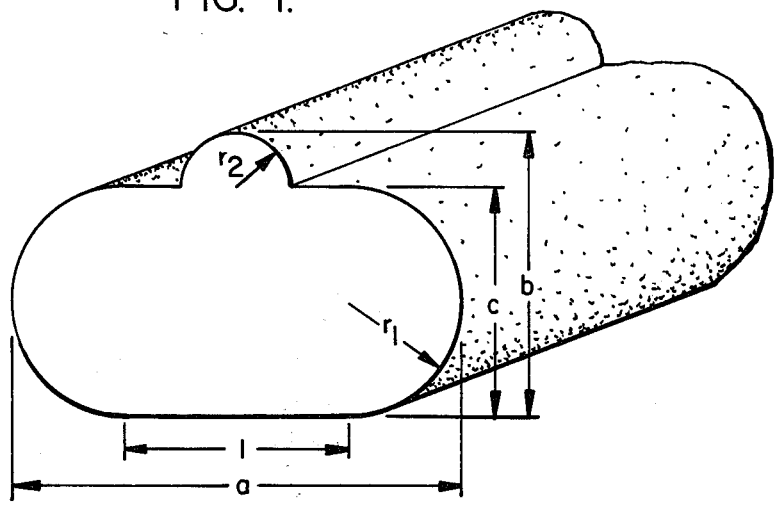
FIG. 2 shows a view of an oval shaped particle with one bump.
Figure 3:
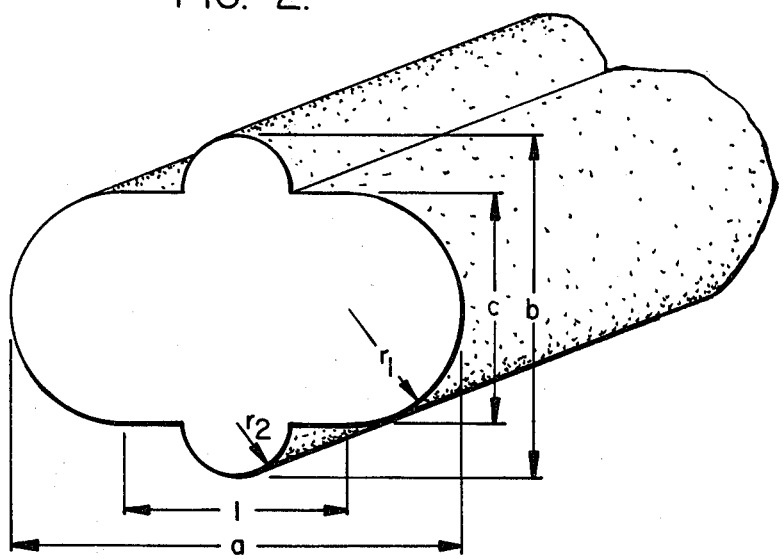
FIG. 3 shows a view of an oval shaped particle with two bumps.

The Figures show shapes that are suitable for this invention. FIG. 1 shows a particle with an oval cross-section. FIG. 2 shows a particle with an oval with a bump. FIG. 3 shows an oval with two bumps. "Oval" is defined as a shape that is two half circles separated by flat regions or less sharply curved regions, for example, elliptical shapes. "Bump" is defined herein as a section that extends from a flat surface of an oval or an area of relatively less curvature in an ellipse. Bumps provide a ridge along the catalyst particles' length. The bumps limit how close any particle can approach any other particle and thereby limit pressure drop in a catalyst bed comprising catalyst particles with bumps in cross-section.

Each particle can be circumscribed by a rectangle having several dimensions, a first overall dimension and, perpendicular to the first dimension, a second overall dimension. The catalyst particles of this invention will have a first dimension in the range of between about 0.0600 inches and about 0.085 inches and a second dimension in the range of between about 0.030 inches to about 0.065 inches.

Table 1 shows various dimensions of the shapes shown such that the surface area-to-volume ratio is less than 95 reciprocal inches.

TABLE 1

| | a | b | c | $r_1$ | $r_2$ |
|---|---|---|---|---|---|
| Oval | | | | | |
| $1 = r_1$ | 1/16" | 1/24" | — | 1/48" | — |
| $1 = 2r_1$ | 1/14" | 1/28" | — | 1/56" | — |
| $1 = 3r_1$ | 1/12" | 1/30" | — | 1/60" | — |
| Surface-to-Volume Ratio: 85.3–92.62 inch$^{-1}$. | | | | | |
| Oval with One Bump | | | | | |
| $1 = 2r_1; r_2 = r_1/2$ | 1/14" | 5/112" | 1/28" | 1/56" | 1/112" |
| $1 = 2r_1; r_2 = r_1$ | 1/13" | 3/52" | 1/26" | 1/52" | 1/52" |
| $1 = 3r_1; r_2 = r_1$ | 1/13" | 3/65" | 1/32" | 1/65" | 1/65" |
| Surface-to-Volume Ratio: 85.3–91.2 inch$^{-1}$. | | | | | |
| Oval with Two Bumps | | | | | |
| $1 = 2r_1; r_2 = r_1/2$ | 1/14" | 3/56" | 1/28" | 1/56" | 1/112" |
| $1 = 3r_1; r_2 = r_1/2$ | 1/12" | 1/20" | 1/30" | 1/60" | 1/120" |
| $1 = 4r_1; r_2 = r_1$ | 1/12" | 1/18" | 1/36" | 1/72" | 1/144" |
| Surface-to-Volume Ratio: 85.8–93.14 inch$^{-1}$. | | | | | |

In Table 1, $r_1$ is a first radius, defined as being the radius at the end of the oval; $r_2$ is the radius of the bump; a is the overall width of the particle; b is the thickness without bumps and is equal to twice $r_1$; and c is the overall thickness through the bumps. The centerpoint of the bump defined by $r_2$ is centered at $\frac{1}{2}$a for the examples shown, although the bump, could be displaced from the center. The oval examples shown all have both curved regions and flat regions. The flat regions are believed to give superior diffusional characteristics to the catalyst particle since each portion of area of the flat surface has a volume that corresponds to it within the catalyst particle that is at a right angle to the surface of the flat area, rather than a wedge shaped volume for each area on a circularly shaped particle. For each segment of interior volume, there is less surface area allowing diffusion to that volume.

The surface area to volume ratios shows a range because it includes the end area of the catalyst particles plus the extruded area for catalyst particles. In Table 1 the range of length is between 2 times a to 4 times a.

Other non-circular shapes that will give a surface area to volume ratio of less than 95 reciprocal inches are within the skill of the art. For example, ovals with more than 2 bumps, shapes having more than one bump on the same side of the oval, and ellipses are within the skill of the art, as well as other shapes.

In the catalyst particles of this invention substantially all of the volume of the particles will be within 0.020 inches of the nearest extruded surface of the catalyst. Substantially all is defined herein to mean at least 85%. Extruded surface is defined to mean the surface of the particle formed by the extrusion die, that is, the shaped side surface and not the end surface.

Metals Penetration

Heterogeneous catalysts, such as metals on inorganic supports, are the preferred catalysts for many commercial processes. Hydrodemetalation is an example of a process that is catalyzed by heterogeneous catalysts and is believed to be diffusion limited. The catalyst shapes of this invention can be utilized for increasing the effective amount of catalyst volume a feedstock contacts in any diffusion limited reaction, while preventing undue pressure drop across the catalyst bed.

In one preferred embodiment catalyst particles of this invention are characterized by substantial metals penetration during hydroprocessing service to at least 0.012 inch from the nearest particle surface. Substantial metals penetration is herein defined as penetration of nickel or vanadium to that distance where the local concentration of metal, expressed as a percentage of maximum concentration of the metal within the particle, is at least 2% for nickel and vanadium.

It has been observed that nickel-containing compounds tend to penetrate demetalation catalysts more easily than vanadium compounds, therefore, when the vanadium concentration at a depth of 0.012 inch is at least 2%, of the maximum vanadium concentration within the particle, the nickel concentration at a depth of 0.012 inch will be about 10% or more of the maximum nickel concentration of the particle.

Metals concentration within the particle can be analyzed by electron microprobes. The electrons from the probe excite metals on prepared cross-sections of used catalyst particles sufficiently that they emit characteristic X-rays, which can be compared to samples of standard metal concentration allowing concentrations of particular metals to be determined for different distances from the surface of the particle.

If the entire volume of demetalation catalyst is effectively used for demetalation, rather than just the volume of the catalyst nearest the surface of the particles, reactors charged with such catalyst need not be recharged as frquently. Since hydrodemetalation is believed to be diffusion limited, other factors than shape may be optimized to create a superior demetalation catalyst. These include overall particle diameter, internal surface area and pore diameter, intrinsic activity and reaction conditions especially temperature.

By increasing surface-to-volume ratio by shaping catalyst particles, the distance an asphaltene molecule has to diffuse into the particle to reach the particle's center is reduced, and more of the catalyst volume can be used for demetalation. The catalsts used for demetalation are sensitive to the intrinsic activity of the catalyst particle. Lower intrinsic activity allows metals to diffuse farther into the particle before reacting. Therefore, more of the particle can have a longer effective life and pore mouths on the surface of the catalyst will not foul as rapidly due to premature metal deposition.

Tables 2 and 3 show metals penetration for catalysts of different porosity. Cylindrically shaped catalysts were chosen since it is easier to measure metals concentrations at fractional radii for cylinders than for non-cylindrical shapes.

TABLE 2

Metals Penetration in Arabian Heavy
Atmospheric Residuum Hydroprocessing
Over .031 in. Radius (1/16″ diameter) Cylinder
With Mean Pore Diameter of Approximately 140 Angstroms

| Location | Local Metal Concentration Maximum Metal Concentration | |
|---|---|---|
| | Nickel | Vanadium |
| .0085 in. From Edge | .24 | .09 |
| 0.015 in. From Edge | .12 | .02 |
| 0.031 in. From Edge (center) | .08 | .01 |

Table 2 shows the metals penetration for nickel and vanadium for a cylindrically extruded alumina catalyst with a mean pore diameter of about 140 Angstroms. There is substantial metals penetration as deep as 0.015 inch from the edge for both nickel and vanadium, and metals penetrate all the way to the center of the particle.

TABLE 3

Metals Penetration in Arabian Heavy
Atmospheric Residuum Hydroprocessing
Over Bimodal Pore .032 in. Radius (1/16″ diameter)
Cylinder With Average Pore Diameter of About 170
And About 19% Pore Volume in 1000 Angstroms + Pores

| Location | Local Metal Concentration[1] Maximum Metal Concentration | |
|---|---|---|
| | Nickel | Vanadium |
| .0085 in. From Edge | .56–.84 | .42–.48 |
| .015 in. From Edge | .48–.80 | .29–.31 |
| .032 in. from Edge (Center) | .39–.69 | .14–.17 |

[1]Ranges indicate samples taken from top, middle, and bottom of bed.

Table 3 shows metals penetration in cylindrically extruded catalysts having a bimodal pore distribution with an average pore diameter of about 170 Angstroms and about 19% of the pore volume contained in pores with a diameter greater than 1000 Angstroms. Contrasted to the catalyst of Table 2, which has less than 1% of its pore volume contained in pore with a diameter greater than 1000 Angstroms, the metals penetrate much further. In a shaped catalyst of this invention the metals would penetrate easily to the center, which would be about 0.015 inch from the nearest surface.

Although the catalyst of Table 3 allows more metals penetration, the catalyst of Table 2 shows substantial metals penetration. Extruding either catalyst in non-circular cross-sectional shapes will provide more efficient use of internal catalyst volume.

Preparation

A catalyst, hereinafter Catalyst A, useful in the present invention, is prepared according to the procedure described in U.S. Pat. No. 4,113,661 issued to P. W. Tamm, Sept. 12, 1978, entitled, "Method for Preparing a Hydrodesulfurization Catalyst". An 80/20 by weight mixture of Catapal, made by Conoco, alumina and Kaiser alumina are sized in the range below about 150 microns and treated by thoroughly admixing the mixed powders with an aqueous solution of nitric acid, where for each formula weight of the alumina ($Al_2O_3$) about 0.1 equivalent of acid is used. The treated alumina powder is in the form of a workable paste. A sample of this paste completely disperses when one part is slurried in four parts by weight of water. The pH of the slurry is in the range of about 3.8 to about 4.2, usually about 4.0. After aqueous acid treatment of the powders, aqueous ammonium hydroxide is thoroughly admixed into the paste in an amount equivalent to about 80% of the ammonium hydroxide theoretically required to completely neutralize the nitric acid; that is, about 0.08 equivalent of the hydroxide is added to the paste per formula weight of the alumina present. The ammonium hydroxide used is desirably about an 11% by weight solution because the volatile material evolved during drying and calcination content of the treated and neutralized solids should be in the range of 50 to 70 weight percent. With the addition and thorough admixing of ammonium hydroxide, the paste changes to a free-flowing particulate solid suitable as a feed to an extruder. The extruder has a die plate that will extrude the shaped particles of the present invention. The extrudate precursor is freed of loosely-held water by an initial moderate drying step, for example, at a temperature in the range of 75° C. to 250° C. The preparation of the carrier is then completed by calcining the dried extrudate at a temperature between 250° C. to 850° C. in a dry or humid atmosphere.

The resulting carrier has a pore volume of about 0.7 cc per gram, of which at least about 85% is furnished by pores having a diameter in the range between about 80 and 150 Angstroms. Less than about 1.0% of pore volume is furnished by pores larger than 1000 Angstroms. By calcining the catalyst in a 100% steam atmosphere at 450° C. to 600° C. larger pores for example 160 Angstroms to 190 Angstroms, may be obtained.

Another catalyst, hereinafter Catalyst B, useful in the present invention is prepared as follows.

Eight milliliters of 88% formic acid (specific gravity 1.2) was added to 300 milliliters of distilled water. This solution was added to 500 grams of Kaiser alumina at about 50° C. and about 50 milliliters every minute while mixing. The mixing continued for 20 minutes after all the solution had been added. A second solution made from 6 milliliters of 58% ammonium hydroxide, 45 milliliters of a molybdenum solution, and 200 milliliters of distilled water was added at a rate of 50 milliliters per minute while stirring. The molybdenum solution was prepared by dissolving 17.4 grams of $MoO_3$ in 17.2 milliliters of 30% $NH_4OH$ and 26 milliliters of distilled water. The temperature during the second addition was approximately 60° to 65° C. The doughy mixture was extruded with a trilobal fluted die and dried on a screen tray in a preheated oven at 120° C. for 2 hours and then at 200° C. for 2 hours. The dried extrudate was calcined at 680° C. in a steam atmosphere. After one hour, fresh dry air replaced the steam and the extrudate was calcined for another half an hour at 680° C.

Uses

The shaped catalyst particles of the present invention can be used for hydroprocessing hydrocarbonaceous feedstocks, particularly hydrodesulfurization and hydrodemetalation. The generic hydrogen treating conditions include reactions in temperature range of about 200° to 540° C., a total pressure in the range of from about 1 atmosphere to about 300 atmospheres with hydrogen partial pressure up to about 200 atmospheres, a hydrogen to oil feed ratio up to about 9,000 standard cubic liters per liter of oil, and a liquid hourly spaced velocity (LHSV) of about 0.02 to about 25 reciprocal hours.

It has been found that many times a good catalyst for demetalation is not equally good for desulfurization. The reverse is also frequently true. For many feedstocks, two beds of shaped catalyst have been found to remove metals and sulfur better than a bed of one catalyst alone. In particular a first bed is charged with catalyst with pores of 150 Angstroms to 200 Angstroms average calculated diameter and the metals loading of 0 to 2 weight percent cobalt and 2 to 8 weight percent molybdenum such as Catalyst B and a second bed is charged with catalyst with pores of average calculated pore diameter of 120 Angstroms to 150 Angstroms and metals loading of 2 to 4 weight percent cobalt and 5 to 12 weight percent molybdenum, such as Catalyst A. Either bed of catalyst or both beds of catalyst may be shaped. The beds of shaped catalyst have lower pressure drops than could be obtainable by a bed of smaller particles that has the same external particle area and metals loading capacity. The beds may be in one multiple bed reactor or in two or more separate reactors.

What is claimed is:

1. A catalyst for hydroprocessing heavy hydrocarbonaceous feedstocks comprising:
   elongated extrudates of catalyst, said catalyst having between 2 and 15 weigh percent of a catalystic metal from Group VIB and between 0 and 10 weight percent of a catalystic metal from Group VIII, where said weight percent is based on the catalytic metal content of the total catalyst weight, calculated as reduced metal, supported on refractory inorganic oxide;
   said extrudates having oval cross section and a section extending from the flat surface of the oval;
   said extrudate cross section capable of being circumscribed by a rectangle having a first dimension in the range of between about 0.0600 inch to about 0.085 inch, a second dimension, perpendicular to said first dimension in the range of between 0.030 inch to about 0.065 inch;
   said elongated extrudate having a surface area to volume ratio of less than 95 reciprocal inches.

2. The catalyst of claim 1 wherein substantially all points in the interior of said catalyst extrudates are within about 0.020 inches from the nearest extruded surface of said extrudates.

3. The catalyst of claim 1 including an average calculated pore diameter of said catalyst extrudates is within the range of about 120 Angstroms and 700 Angstroms.

4. The catalyst of claim 1 wherein said catalyst extrudates are characterized by substantial penetration of nickel and vanadium of at least 0.012 inches from the nearest surface of said catalyst extrudates.

5. The catalyst of claim 1 wherein the surface area to volume ratio does not exceed 95 reciprocal inches.

6. The catalyst of claim 1 wherein substantially all regions of said extrudates are within 0.020 inch of the nearest surface.

7. The catalyst of claim 1 wherein substantial metals penetration occurs to a depth of at least 0.015 inch from the nearest surface.

8. The catalyst of claim 1 having an average pore diameter of between about 120 Angstroms and 200 Angstroms.

* * * * *